United States Patent Office 3,557,406
Patented Jan. 26, 1971

3,557,406
APPARATUS FOR THE AUTOMATIC PRODUCTION OF GRAMOPHONE RECORDS
Hermann Strausfeld, Cologne-Ehrenfeld, Germany, assignor to Carl Lindstrom Gesellschaft m.b.H., Cologne-Braunsfeld, Germany, a company of Germany
Filed July 16, 1968, Ser. No. 745,153
Claims priority, application Germany, July 17, 1967, L 57,008
Int. Cl. B29d 17/00
U.S. Cl. 18—5.3                                          7 Claims

ABSTRACT OF THE DISCLOSURE

This specification describes apparatus for the automatic production of gramophone records having several stations equally spaced along a production path at which successive operations on the product are carried out. The product is conveyed between stations by a plurality of transfer means, each serving to convey the product from a respective station to the next along the path. All of the transfer means are mounted on two slide bars which reciprocate to provide concurrent operation of the transfer means. The first transfer means consists of two retractable semicircular claws which together encircle a cylindrical space, which is bounded top and bottom by record labels. The space is filled with mouldable material by injection through an orifice formed by the claws and the cake so formed together with the record labels is conveyed by the claws to the moulding press at the next station.

This invention relates to apparatus for the automatic production of gramophone records.

Various types of automatic press for the production of gramophone records have been proposed and various forms of transferring means have been described for introducing the mouldable material from which the record is produced into the press and for handling the record after it has been formed, but hitherto all of the equipments so far described have been relatively complicated and have required a considerable amount of maintenance to ensure their reliable operation.

It is an object of the present invention to provide apparatus for the automatic production of gramophone records which is of relatively simple construction and accordingly does not require a considerable amount of maintenance.

According to the present invention there is provided apparatus for the automatic production of gramophone records having a plurality of operating means for carrying out successive steps in the production of a gramophone record, the operating means being located at a plurality of stations spaced along a production path, a plurality of transfer means, each arranged to convey a product from one station to the next along the production path, and linking members coupling the transfer members so that they operate concurrently, in which a first of the transfer means includes a plurality of claws which together encircle a space, and there are provided means for holding two record labels to close the ends of the space, and means for injecting mouldable material into the space so as to form a cake sandwiched between two record labels, the cake being conveyed by the claws to the next station for moulding into a gramophone record.

Figure 1:
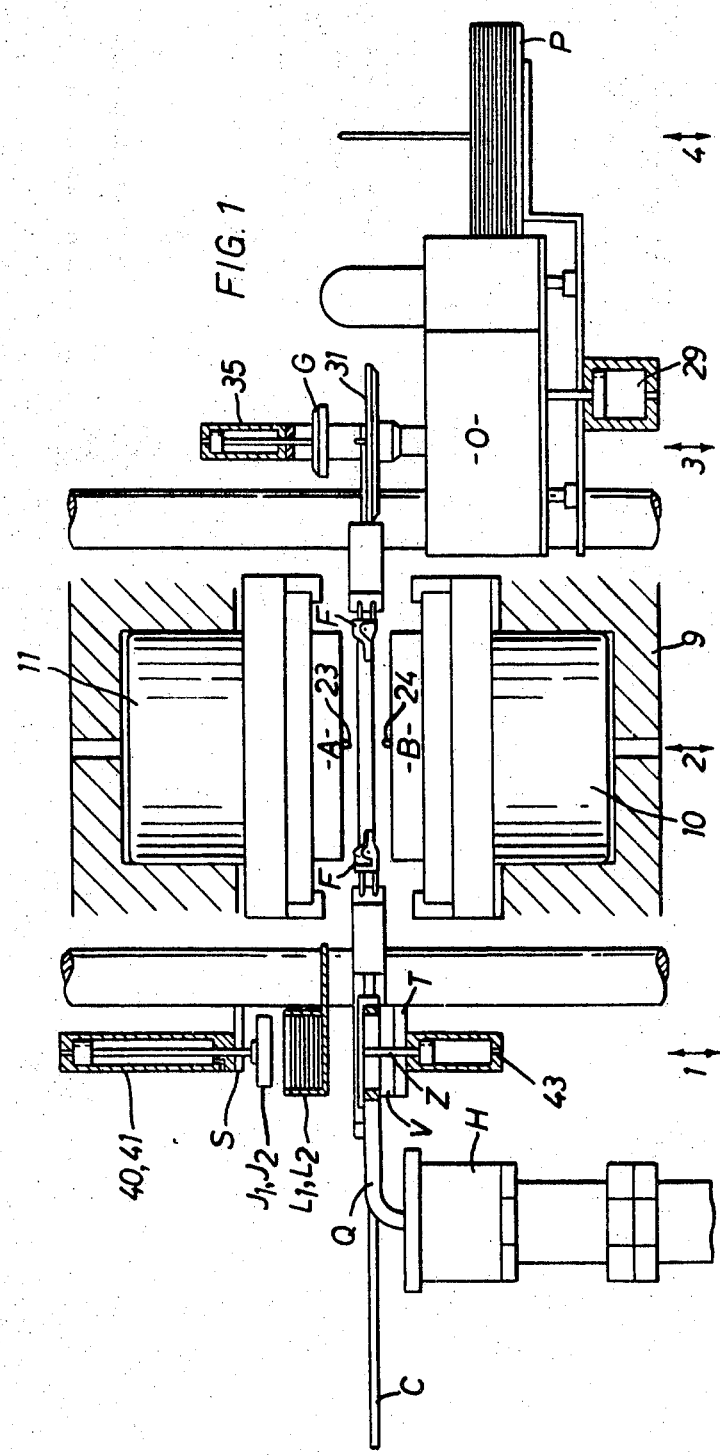
Figure 2:
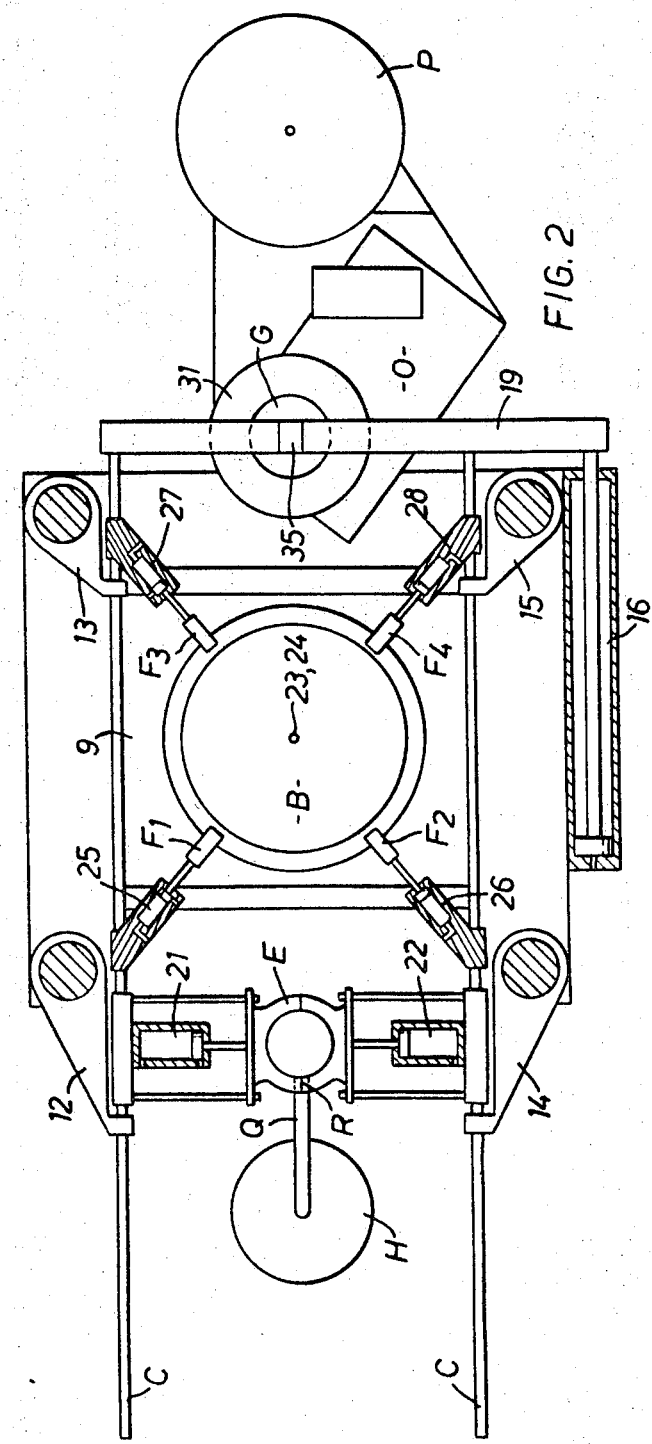
Figure 3:
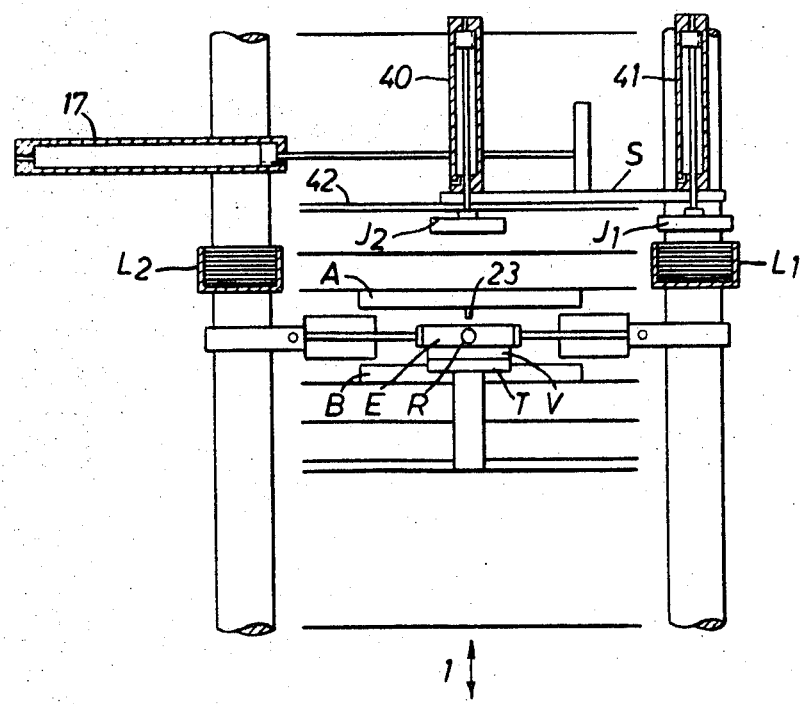

In order that the invention may be fully understood and readily carried into effect it will now be described with reference to the accompanying drawings of which:

FIG. 1 is a side view partly in section of apparatus for the automatic production of gramophone records in accordance with one example of the invention, FIG. 2 is a plan view also partly in section of the apparatus shown in FIG. 1, and FIG. 3 is an end elevation also partly in section of the apparatus shown in FIGS. 1 and 2.

Referring now to the drawings, the gramophone record is formed by a compression moulding press 9, in which the moulding operation is carried out by moving both an upper mould A and a lower mould B together by means of pistons 10 and 11 so that each mould travels appproximately the same vertical distance during the pressing operation, the direction of movement of one mould being opposite to the direction of movement of the other mould. In the apparatus the product is moved along a straight and substantially level path from one station to the next and in this specification for convenience this path is referred to as the production path, although it will be understood that during any of the transfer operations the product may depart from this level. The term product is employed to refer to the mouldable material from its first formation into a cake to the final production of a finished gramophone record.

In the apparatus two longitudinal slide bars C extend along the length of the apparatus at about the same level as the production path and form the linking members joining the different transfer means of the apparatus. The slides C are guided by respective pairs of guides 12 and 13, and 14 and 15 which are securely mounted on the frame of the apparatus. The slides C are mechanically coupled by a bridge member 19 which joins them to a hydraulic mechanism 16 which serves to drive the slides C from left to right and back again in a predetermined repetitive rhythm determined by control means, but shown.

A plurality of operating means for operating on the product are situated at four stations numbered respectively 1, 2, 3 and 4 equally spaced along the production path. Three transfer means are fixedly mounted on the slides C and spaced apart by the distance from one station to the next. These transfer means respectively comprise a pair of semi-circular claws E serving to transfer the product between hte first station and the second, a system of four grabs F1, F2, F3 and F4 serving to transfer the product from the second station to the third, and a vacuum grab G mounted on the bridge member 19 serving to transfer the product from the third station to the fourth. As described above the hydraulic mechanism 16 serves to move the slides C and the transfer means attached thereto from left to right over the distance between adjacent stations and back again. The operation of the mechanism 16 is initiated as soon as all of the operating means along the production path have completed their respective operations on the product presented to them; these operations are normally arranged to occur concurrently.

At the beginning of the production path, that is to say, at station 1 there is located a dispensing means H for the mouldable material from which the record is to be formed. A predetermined quantity of the material, which has been rendered plastic by the application of heat thereto is to be injected along a pipe Q into a flat cylindrical space formed by two semi-circular grabs E of the first transfer device which are held closed to form a ring by pneumatic mechanisms 21 and 22 respectively. The diameter of the space formed inside the claws E is about 10 millimetres less than the diameters of the labels.

Supplies of the two record labels are held in the magazines L1 and L2 located one on each side of the production path and prior to the injection of the mouldable material into the space formed by the claws E a label from the magazine L1 is picked up by vacuum grab J1 and placed on table T with its printed side downwards and is held there by vacuum system V. A centering pin Z is moved up under the control of hydraulic mechanism 43 to effect the centering of the label on the table T. When the label has been placed on the table T the claws E of the first transfer means are moved inwards by pneumatic mechanisms 21 and 22 to form a flat cylindrical space bounded below by the label on the table T. The claws E are shaped so as to form a hole R in the side of the cylindrical space produced when the claws are brought together, and into the hole R projects pipe Q from dispensing means H for the mouldable material.

The vacuum grab J1 is raised and lowered by a mechanism 41 mounted on a support S. The support S also bears mechanism 40 used for raising and lowering a second vacuum grab J2. When the grab J1 has placed the label printed side downwards on the table T the grab J2 is used to pick-up a label from the magazine L2 and this label is used to close the upper face of the flat cylindrical space defined by the claws E. The support S is moved from side to side along a guide 42 under the control of a mechanism 17. A predetermined quantity of the mouldable material which has been rendered plastic by the application of heat thereto is now injected by the dispenser H into the space formed by two semi-circular claws E of the first transfer device and bounded above and below by the two record labels. Upon the completion of the operations at the various stations of the apparatus the slide C is caused to move to the right taking with it the claws E with the cake of mouldable material sandwiched between the two record labels held between them. The centring pin Z forms a central hole in the cake and is retracted before the movement of the slide C. The central hole formed by the pin Z may perforate the cake.

When the slide C is driven to the right, the claws E carry the cake into the middle of the space between the two moulds A and B situated at station 2. Thereupon, two centring pins 23 and 24 are caused to project from the surfaces of the moulds A and B into the hole made by the centring pin Z in the centre of the cake so as to hold it, after which the claws E are opened, releasing the product. The return of the slide C to the left carries the claws E back to station 1. The press 9 is now operated. The two moulds A and B are pressed together by hydraulically operated pistons 10 and 11 which are controlled by hydraulic flow dividers so that the moulds move together by an equal distance. In this way the moulds A and B which include pressure dies together with the centring pins 23 and 24, form a gramaphone record with a central hole complete with a label attached to the upper and lower central portion, substantially at the level of the production path. Moulding material exudes from the outer edges of the mould to form the flash which enters the opened jaws of four grabs $F_1$, $F_2$, $F_3$ and $F_4$, controlled by pneumatic mechanisms 25, 26, 27 and 28, and situated at intervals round the circumference of the mould. The grabs $F_1$, $F_2$, $F_3$ and $F_4$ are secured respectively to the slides C, C. After the moulding process, the moulds are cooled, following the usual practice, by passing a cooling fluid through channels within the moulds A and B, and the flash is also cooled at the same time. Just before the moulds A and B are drawn apart in a symmetrical movement, the four grabs $F_1$, $F_2$, $F_3$ and $F_4$ are pneumatically closed by the mechanisms 25, 26, 27 and 28, and are at the same time, pulled slightly in a direction outwards, away from the centre of the record, so that the flash is stretched, and on opening the press, this stress is transmitted to the record itself.

With the next movement of the slide C to the right, the four grabs $F_1$, $F_2$, $F_3$, $F_4$, carry the product, which is now in the form of a gramophone record with the flash still attached, to the next station 3 at which the edge cutting operation is carried out.

The edge cutting machine O may take any convenient form, several of which have been proposed hitherto. The cutting machine O is raised by the pneumatic mechanism 29, on the arrival of the record at station 3, so that the centring pin of the turntable 31 engages the central hole of the newly pressed gramophone record. As soon as this has been carried out the grabs $F_1$, $F_2$, $F_3$, $F_4$ open, and move back clear of the record so that the record now rests on the turntable of the edge-cutting machine. The slide C now returns to the left carrying the grabs $F_1$, $F_2$, $F_3$ and $F_4$ back to their positions round the press 9 at station 2 ready for the next record.

The flash is then removed by rotating cutter blades on the edge trimming machine O, and when this operation is complete, a vacuum grab G is caused to descend by means of the pneumatic mechanism 35, carried by bridge member 19, until it rests on the surface of the upper record label to which it attaches itself by means of a partial vacuum, and then lifts the record from the turntable 31 of the edge cutting machine O. When the slide C next moves to the right, the record is carried by the grab G to the next station which is numbered 4, where there is situated reception means for receiving the finished record. In the embodiment illustrated, the reception means comprises a turntable or plate P with a long central spindle on which finished records may be stacked prior to packaging. However, the reception means may equally well comprise any convenient form of automatic record packaging means, in which the record is automatically inserted in the record sleeve in which it will ultimately be sold.

It will be understood that the automatic record producing apparatus described with reference to FIGS. 1, 2 and 3, may readily be adapted for producing records of different diameters. Thus claws E may be made removable and provided in different sizes, the radial position of the grabs $F_1$, $F_2$, $F_3$ and $F_4$ may be made adjustable, interchangeable compression moulds A and B may be provided and an adjustable edge cutting machine O may be employed to adapt the apparatus to different record diameters.

In accordance with the invention the devices described may be combined and their method of operation so matched in space and time to one another that the advantages are obtained of providing a regular working operation requiring little maintenance and above all of speeding up the manufacturing process.

While the invention has been described with reference to a specific embodiment it is not intended that the scope of the invention should be limited thereby. For example, the slides C need not be straight but may follow arcuate paths.

What we claim is:

1. Apparatus for the automatic production of gramophone records having a plurality of operating means for carrying out successive steps in the production of a gramophone record, the operating means being located at a plurality of stations spaced along a production path, a plurality of transfer means, each arranged to convey a product from one station to the next along the production path, and linking members coupling the transfer members so that they operate concurrently, in which a first of the transfer means includes a plurality of claws which together encircle a space, and there are provided means for holding two record labels to close the ends of the space, and means for injecting mouldable material into the space so as to form a cake sandwiched between two record labels, the cake being conveyed by the claws to the next station for moulding into a gramophone record.

2. Apparatus according to claim 1 in which the first transfer means includes two claws which are so shaped as to provide an orifice in the side of the space encircled by the claws through which orifice the mouldable material is injected into the space.

3. Apparatus according to claim 1 in which the means for holding the record labels includes a centring pin for forming a hole in the cake.

4. Apparatus according to claim 3 in which the centring pin is retractable.

5. Apparatus for the automatic production of gramophone records including,
(a) cake containing means,
(b) record forming means
(c) supply means for supplying mouldable material to said cake containing means, said supply means being spaced from said record forming means,
(d) reciprocating cake transfer means for moving said cake containing means from a supply station in cooperative relationship with said supply means to said record forming means and back again,
(e) a pair of record label magazines situated one on each side of said supply station and equidistant therefrom,
(f) label transfer means reciprocable to transfer labels to said supply station,
(g) the label transfer means including a reciprocable support member carrying two label pick-up devices spaced apart by an amount equal to the distance of each label magazine from said supply station, and
(h) timing means for controlling the operation of said label transfer means, said cake transfer means, said supply means and said record forming means to produce repetitive record production operations, in each of which a cake is supplied to said cake containing means by said supply means, two labels are provided respectively above and below said cake by said label transfer means, said cake and said labels are transferred by said cake transfer means to said record forming means and the record is formed in said record forming means.

6. Apparatus according to claim 5 wherein said label transfer means is operable to transfer a first label to said supply station while the cake containing means is away from said supply station, a table being provided to receive said first label beneath the path of said cake containing means so that the cake containing means can return over said first label.

7. Aparatus for the automatic production of gramophone records including a cake moulding station, means for supplying labels to said cake moulding station, a record pressing station, an edge cutting station and a receiving station for a finished record, all said stations being situated along a straight production path, a plurality of transfer means each arranged to convey a product from one station to the next along said production path and linking members coupling the transfer means so that they operate concurrently, a first of said transfer means including a plurality of claws which together encircle a cake moulding space at the cake moulding station, means for supplying mouldable material to the cake moulding station, a stationary support closely beneath the cake moulding station, pin means reciprocable centrally into and out of the cake moulding space, a label supply magazine on each side of the cake moulding station, wherein labels are supplied to the cake moulding station from each magazine in turn by means of a slide reciprocable transversely of the production path and carrying two vacuum grab devices operable independently of each other, one of the labels being supplied with its printed side downwards by a first one of said vacuum grab devices to said stationary support and retained thereon by vacuum and the other label with its printed side upwards being pressed by the other of said vacuum grab devices against said claws, the diameter of said cake moulding space being smaller than the diameter of said labels, whereby in operation mouldable material supplied from the supply means laterally through a nozzle into said cake moulding space is there preformed into a cake perforated by said pin means and having labels firmly adhering thereto.

References Cited
UNITED STATES PATENTS

| | | | |
|---|---|---|---|
| 2,743,478 | 5/1956 | Harlow et al. | 18—5.3P |
| 3,186,029 | 6/1965 | Joseph | 18—5.3P |
| 3,329,997 | 7/1967 | Rand et al. | 18—5.3P |
| 3,412,427 | 11/1968 | Flusfeder et al. | 18—5.3P |

J. HOWARD FLINT, JR., Primary Examiner